(12) United States Patent
Oikawa et al.

(10) Patent No.: US 8,132,896 B2
(45) Date of Patent: Mar. 13, 2012

(54) LIQUID DISCHARGE HEAD AND METHOD OF MANUFACTURING THE SAME

(75) Inventors: Satoshi Oikawa, Yokohama (JP); Osamu Morita, Yokosuka (JP)

(73) Assignee: Canon Kabushiki Kaisha, Tokyo (JP)

( * ) Notice: Subject to any disclaimer, the term of this patent is extended or adjusted under 35 U.S.C. 154(b) by 285 days.

(21) Appl. No.: 12/639,637

(22) Filed: Dec. 16, 2009

(65) Prior Publication Data
US 2010/0156996 A1 Jun. 24, 2010

(30) Foreign Application Priority Data
Dec. 19, 2008 (JP) .................................. 2008-324478

(51) Int. Cl.
*B41J 2/05* (2006.01)
(52) U.S. Cl. ......................................................... 347/65
(58) Field of Classification Search .................... 347/54, 347/56, 63, 65; 430/320
See application file for complete search history.

(56) References Cited

U.S. PATENT DOCUMENTS

| 6,426,481 | B1 * | 7/2002 | Koide et al. .............. 219/121.71 |
| 7,261,397 | B2 | 8/2007 | Morita | |
| 7,591,546 | B2 | 9/2009 | Morita | |

FOREIGN PATENT DOCUMENTS

| JP | 2005-096422 | 4/2005 |
| JP | 2007-283668 | 11/2007 |

* cited by examiner

*Primary Examiner* — An Do
(74) *Attorney, Agent, or Firm* — Canon USA Inc IP Division

(57) ABSTRACT

A liquid discharge head includes a liquid discharge substrate including a discharge port for discharging liquid, and a flow path member including a transparent member that is transparent to a laser beam, an absorption member capable of absorbing a laser beam, and a flow path for supplying liquid to the liquid discharge substrate, wherein the flow path is formed between the transparent member and the absorption member by emitting a laser beam toward a flow path portion of the absorption member constituting a portion of a wall of the flow path and toward a periphery of the flow path portion through the transparent member and thereby welding the transparent member and the absorption member at the periphery of the flow path portion, and wherein the flow path portion includes an inclined surface inclined with respect to a direction of the laser beam that has passed through the transparent member.

10 Claims, 14 Drawing Sheets

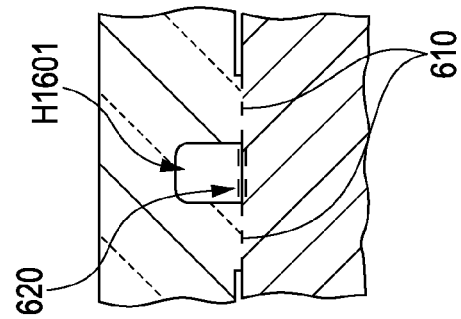
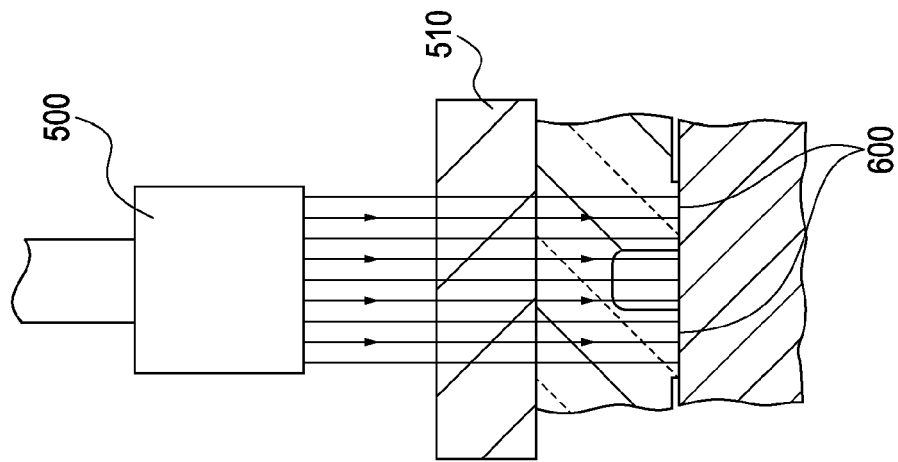
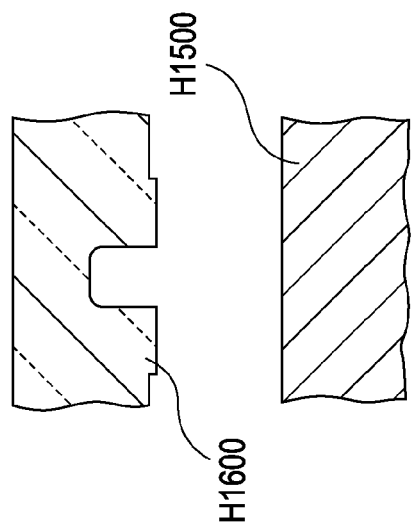

LIQUID DISCHARGE HEAD AND METHOD OF MANUFACTURING THE SAME

BACKGROUND OF THE INVENTION

1. Field of the Invention

The present invention relates to a liquid discharge head for performing recording on a recording medium by, for example, discharging liquid such as ink and to a method of manufacturing the liquid discharge head. In particular, the invention relates to a liquid discharge head for performing inkjet recording.

2. Description of the Related Art

Inkjet recording heads are examples of liquid discharge heads that are generally known.

Referring to FIGS. 8A to 8C, a structure of an inkjet recording head is briefly described.

As illustrated in FIG. 8A, an inkjet recording head H1001 includes a tank holder unit H1003 and a recording element unit H1002 for discharging ink.

Ink is supplied from an ink tank (not illustrated) to the recording element unit H1002 through an ink flow path formed in the tank holder unit H1003.

The ink flow path is formed in the tank holder unit H1003 by joining a tank holder H1500 illustrated in FIG. 8B to a flow path plate H1600 illustrated in FIG. 8C.

Known methods for joining the tank holder H1500 to the flow path forming plate H1600 include ultrasonic welding (Japanese Patent Laid-Open No. 2007-283668) and laser welding (Japanese Patent Laid-Open No. 2005-096422).

Among the two methods, the laser welding method will be described.

The term "laser welding" generally refers to a method of making a member that is transparent to a laser beam and a member that is capable of absorbing a laser beam contact each other and irradiating a region to be welded with a laser beam so as to join the members together.

As compared with ultrasonic welding, laser welding has an advantage in that foreign matter is negligibly generated at the welded portion and is used as effective means for forming an ink flow path.

Referring to FIGS. 9A to 9C and FIGS. 10A to 10C, which are schematic sectional views of the recording head illustrated in FIGS. 9A to 9C, a method of joining a tank holder H1500 to a flow path forming plate H1600 by laser welding described in Japanese Patent Laid-Open No. 2005-096422 will be described.

The tank holder H1500, which is capable of absorbing a laser beam, and the flow path forming plate H1600, which is transparent to a laser beam, are made to contact each other using a press jig 510 (FIGS. 9A and 10A). Subsequently, while the tank holder H1500 and the flow path forming plate H1600 are in contact with each other, a contact surface 600 is irradiated with a laser beam (FIGS. 9B and 10B) so that weld portions 610 are formed and thereby an ink flow path H1601 is formed (FIG. 10C).

In general, examples of laser irradiation methods include a scanning method, which is described in Japanese Patent Laid-Open No. 2005-096422, and a simultaneous irradiation method.

With the scanning method, a desired welding region H1602 is irradiated with a laser beam along a path in the welding region H1602 (see FIGS. 8B and 8C) in a scanning manner by focusing the laser beam to a small spot, the laser beam being emitted from a laser beam irradiation apparatus 500 as illustrated in FIGS. 9B and 10B.

With the simultaneous irradiation method, a desired welding region is irradiated with a laser beam in one go.

The ink flow path has a fine structure and the welding region is very small. In such a case, the scanning method and the simultaneous irradiation method have the following situations.

The scanning method has a situation in that a very long time is required to focus the laser beam on a desired path in a very small welding region, scan the region along the path, and weld the region.

For example, as illustrated in FIGS. 8B and 8C, the desired welding region H1602 and an ink flow path H1601 of the inkjet recording head have fine structures with very small widths. Thus, irradiating areas excluding the ink flow path H1601 as illustrated in FIG. 10B is extremely time-consuming. Therefore, the scanning method is not suitable for manufacturing a large number of inkjet recording heads.

In contrast, with the simultaneous irradiation method, the time required for welding can be reduced. However, when a welding region has a fine structure, providing a mask on a portion corresponding to a fine ink flow path and irradiating only the welding region with a laser beam is difficult.

Referring to FIGS. 11A to 11C, the simultaneous irradiation method for welding the tank holder H1500 and the flow path plate H1600 will be described. As illustrated in FIG. 11B, both the contact surface 600 and a region to become the ink flow path H1601 are simultaneously irradiated with a laser beam so that weld portions 610 are formed. As a result, as illustrated in FIG. 11C, a damaged portion 620 may be formed on a surface of the ink flow path H1601 by the laser beam.

If the damaged portion 620 is generated in the ink flow path H1601, the damaged portion 620 may impede the flow of ink and may impair the reliability of the inkjet recording head H1001.

SUMMARY OF THE INVENTION

The invention provides an inkjet recording head in which damage to an ink flow path caused by a laser beam can be reduced when members that form the ink flow path are welded together by irradiating a region including the ink flow path with a laser beam.

A liquid discharge according to the invention includes a liquid discharge substrate including a discharge port for discharging liquid, and a flow path member including a transparent member that is transparent to a laser beam, an absorption member that is capable of absorbing a laser beam, and a flow path for supplying liquid to the liquid discharge substrate, wherein the flow path is formed between the transparent member and the absorption member by emitting a laser beam toward a flow path portion of the absorption member constituting a portion of a wall of the flow path and toward a periphery of the flow path portion through the transparent member and thereby welding the transparent member and the absorption member to each other at the periphery of the flow path portion, and wherein the flow path portion includes an inclined surface inclined with respect to a direction of the laser beam that has passed through the transparent member.

Further features of the present invention will become apparent from the following description of exemplary embodiments with reference to the attached drawings.

BRIEF DESCRIPTION OF THE DRAWINGS

FIGS. 11A to 11C are explanatory views of a simultaneous laser welding method.

DESCRIPTION OF THE EMBODIMENTS

A liquid discharge head according to an embodiment will be described using an example of a general inkjet recording head.

In this specification, the term "recording" not only refers to forming meaningful information such as characters or figures but also to forming meaningless information irrespective of whether the information is visually perceptible to the human eye. Moreover, the term broadly refers to forming an image, a design, a pattern or the like on a recording medium or processing the recording medium.

The term "recording medium" refers not only to general paper that is used for recording apparatuses but also to any material that can receive ink, such as cloth, a plastic film, a metal plate, glass, a ceramic, wood, and leather.

The term "ink", which should be interpreted in a broad sense as the term "recording medium", refers to liquid that can be used for forming an image, a design, a pattern or the like on a recording medium; liquid for processing a recording medium; and liquid for treating ink. Thus, the term "ink" refers to any liquid that can be used in regard to recording.

Figure 6A:
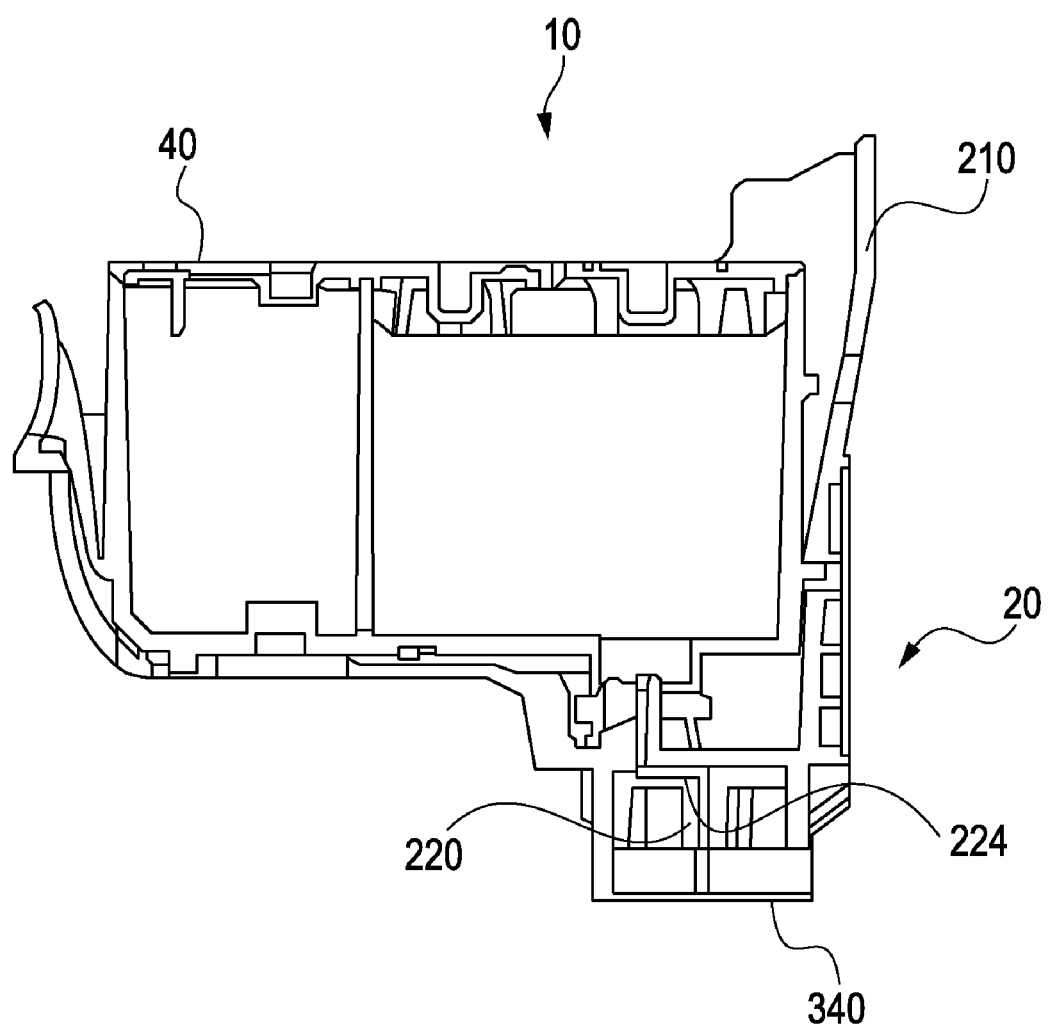
FIGS. 6A and 6B are explanatory views of a general recording head to which the invention is applicable.
Figure 6B:
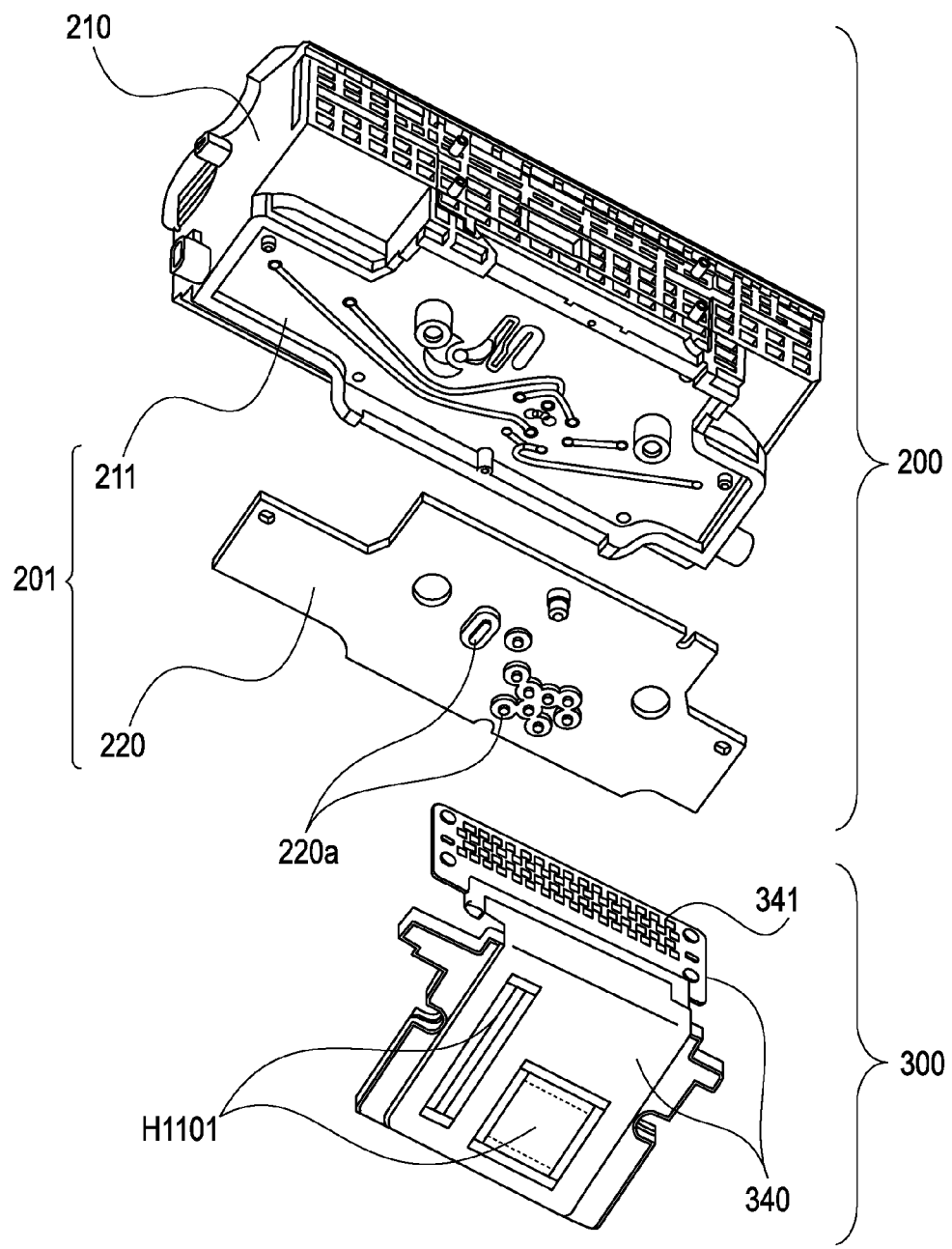

An inkjet recording head of the invention (hereinafter referred to as "recording head") includes discharge ports for discharging ink and an ink flow path that communicates with the discharge ports so as to supply ink to the discharge ports. Referring to FIGS. 6A and 6B, an example of the recording head constituting a recording head cartridge will be described.

As illustrated in FIG. 6A, a recording head cartridge 10 includes a recording head 20 and an ink tank 40. The ink tank 40 is detachably mounted on the recording head 20.

The recording head cartridge 10 is attached to and supported by positioning members and electric contacts of a carriage (not illustrated) of an inkjet recording apparatus (not illustrated) in a detachable manner. (Hereinafter, an inkjet recording apparatus is referred to as a "recording apparatus").

Ink is supplied to the recording head 20 from the ink tank 40. The recording head 20 discharges ink from discharge ports formed in a recording element substrate H1101 by driving recording elements in accordance with electric signals supplied from the recording apparatus. Examples of the recording elements include exothermic elements and piezoelectric elements. A recording head using exothermic elements will be described here.

FIG. 6B is an exploded perspective view of the recording head 20 illustrated in FIG. 6A.

The recording head 20 includes a recording element unit 300 and a tank holder unit 200. The recording element unit 300 includes an electric wiring substrate 340 and a recording element substrate H1101.

The electric wiring substrate 340 includes connection terminals 341 for connecting the electric wiring substrate 340 to the recording apparatus, electrode terminals (not illustrated) for connecting the electric wiring substrate 340 to the recording element substrate H1101, wiring lines for connecting the connection terminals 341 to the electrode terminals, and openings for incorporating the recording element substrate H1101.

The electric wiring substrate 340 is connected to the recording element substrate H1101, for example, in the following manner. Electrically conductive thermosetting adhesive resin is applied to electrode portions disposed on the recording element substrate H1101 and to the electrode terminals of the electric wiring substrate 340; and the electrode portions and the electrode terminals are simultaneously pressed and heated using a heat tool, so that the electrode portions and the electrode terminals are electrically connected to each other simultaneously. The area at which the electrode portions and the electrode terminals are electrically connected is sealed with a sealing compound, so that the area is protected from corrosion caused by ink or from an external shock.

Figure 7:
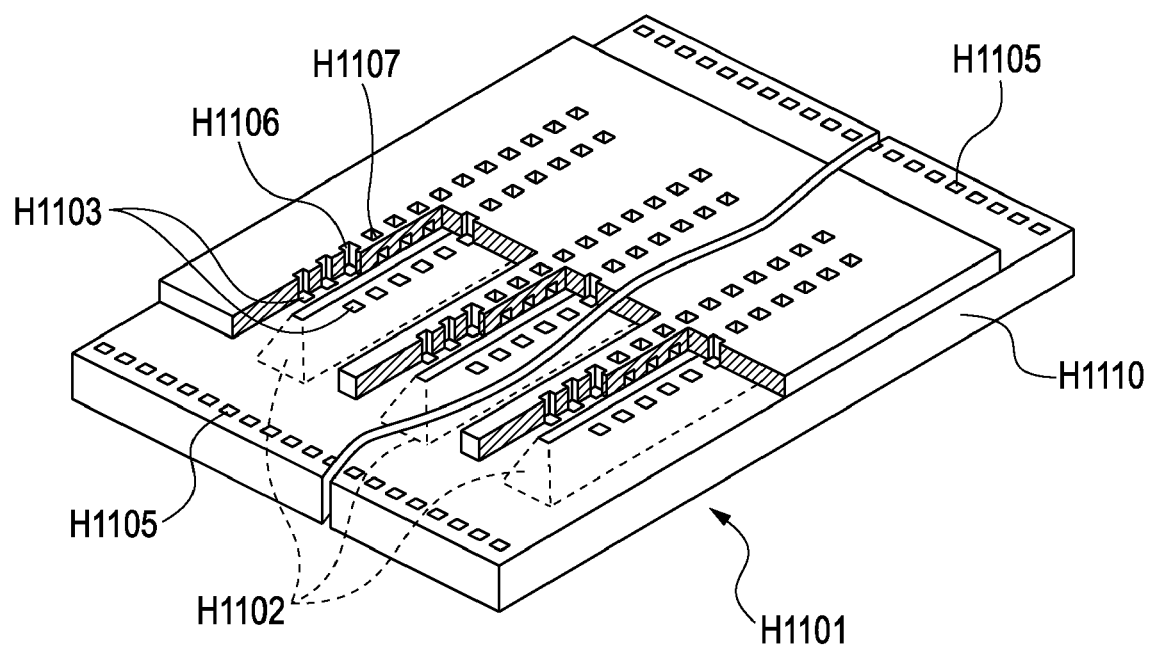
FIG. 7 is an explanatory view of a recording element substrate included in a general recording head.
Figure 8A:
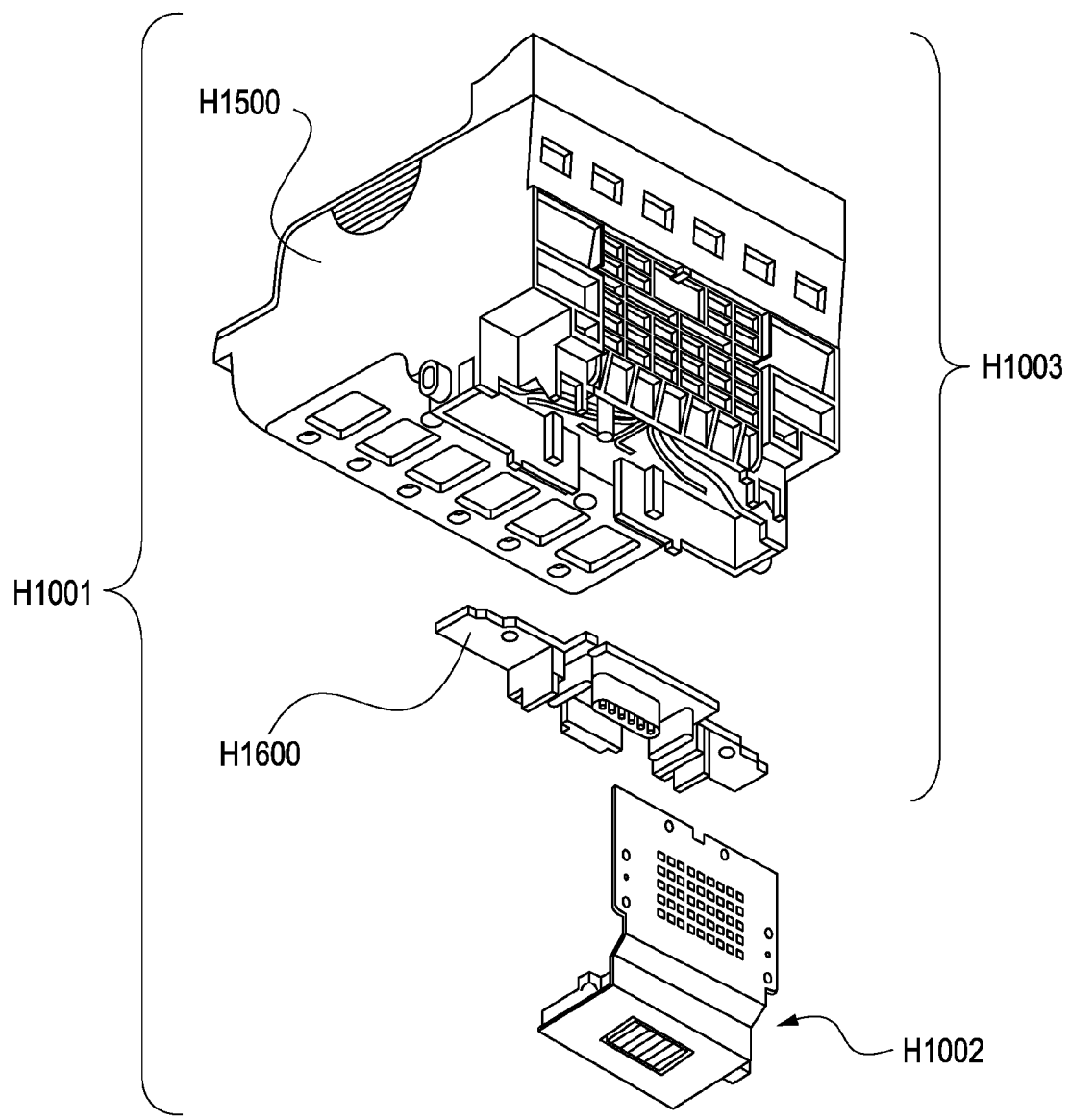
FIGS. 8A to 8C are explanatory views of an existing recording head.
Figure 8B:
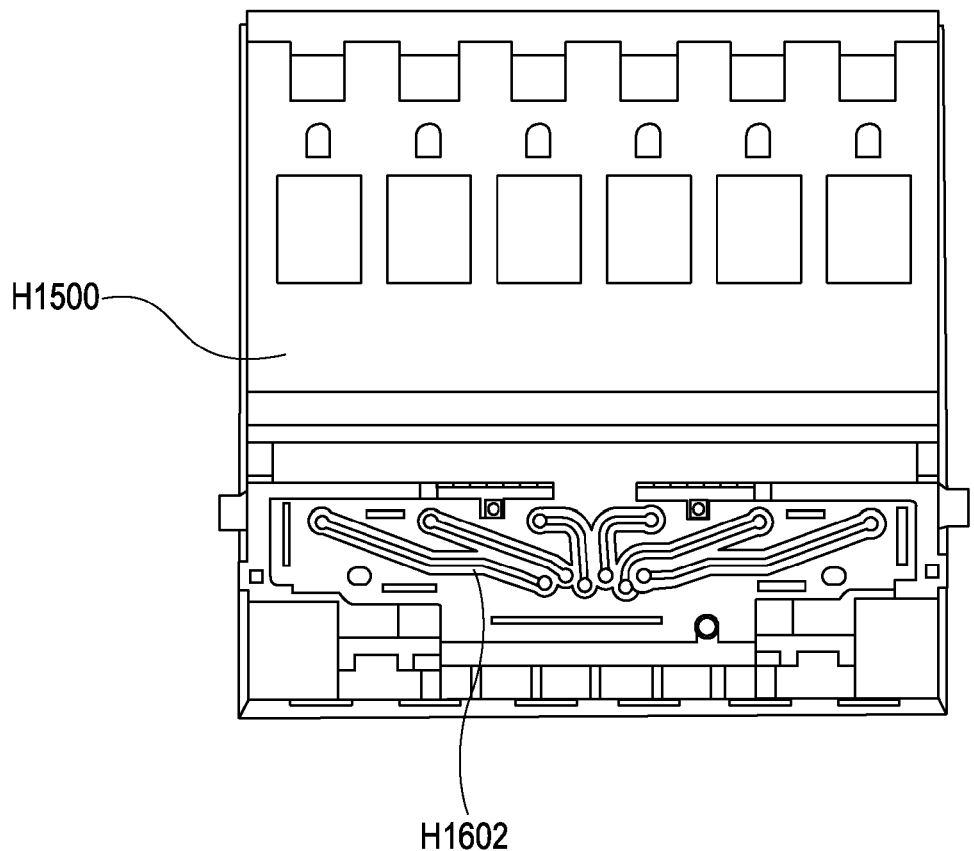
Figure 8C:
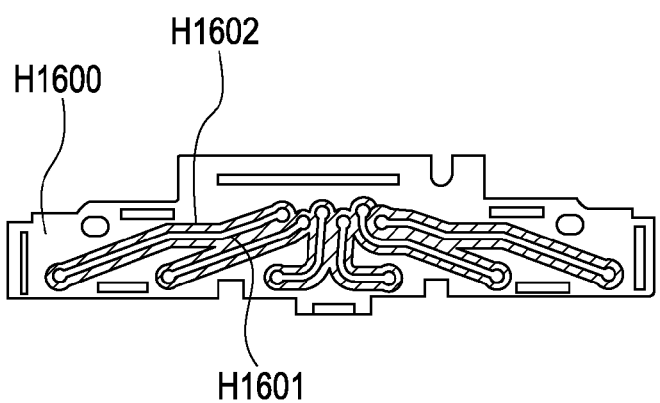
Figure 9A:
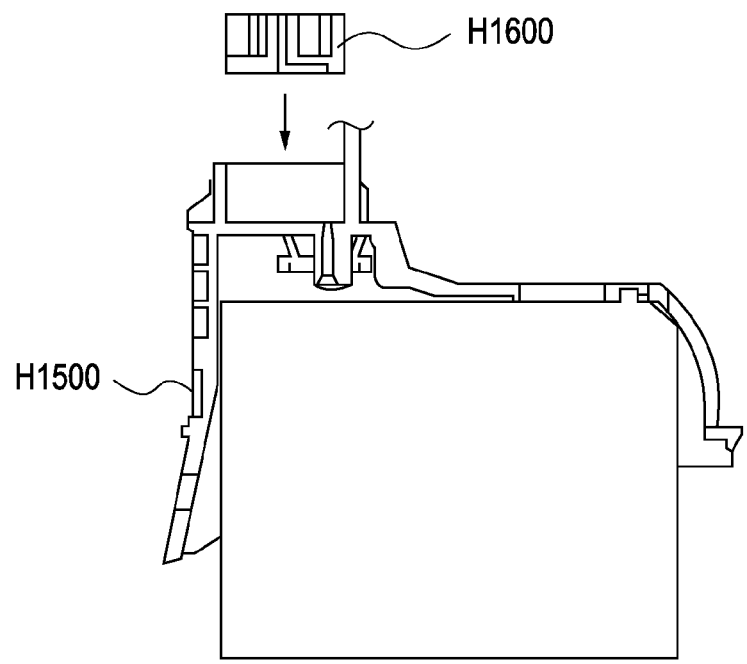
FIGS. 9A and 9B are explanatory views of an existing laser welding method.
Figure 9B:
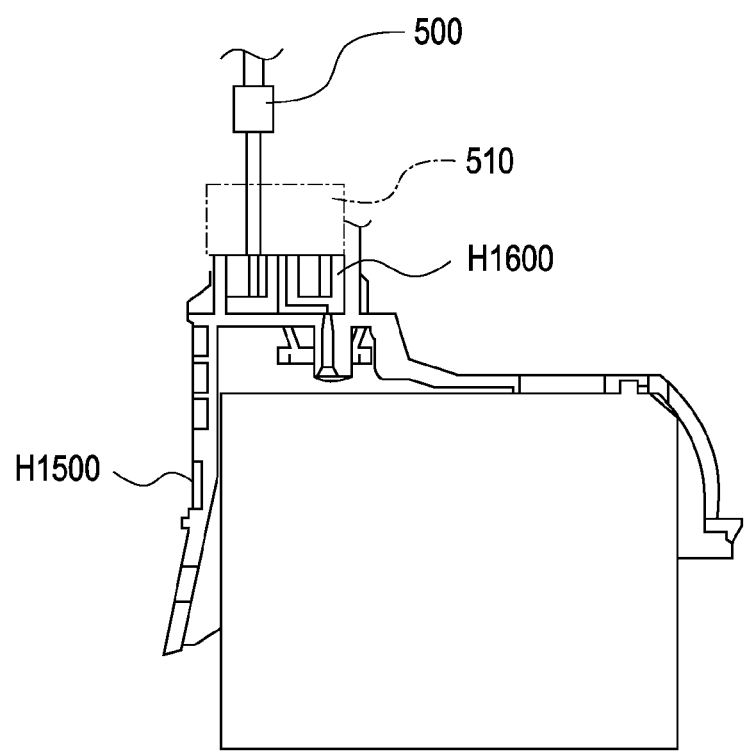
Figure 10C:
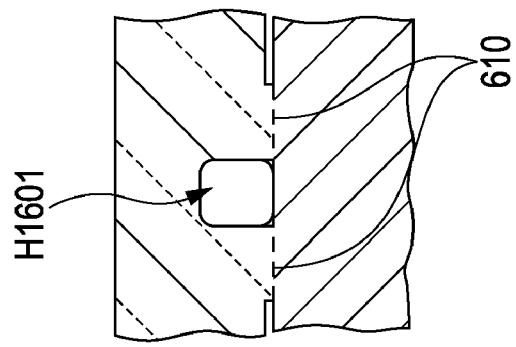
FIGS. 10A to 10C are explanatory views of a scanning laser welding method.
Figure 10B:
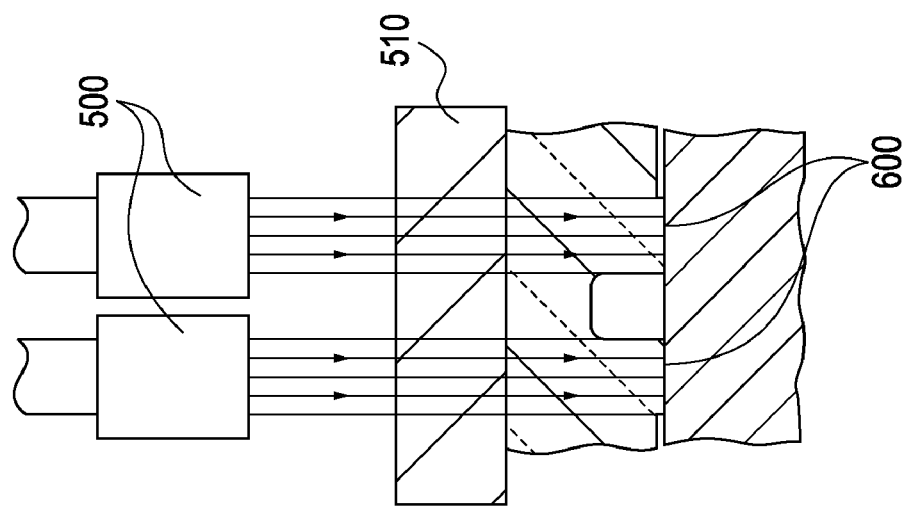
Figure 10A:
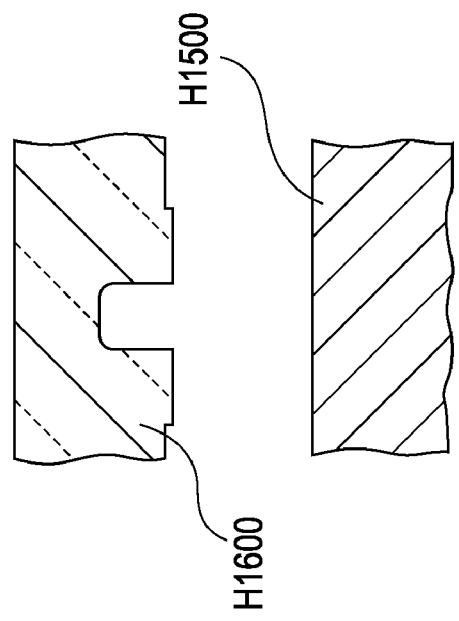

FIG. 7 is a partially sectional perspective view for describing a structure of the recording element substrate H1101 serving as a liquid discharge substrate for discharging ink.

The recording element substrate H1101 includes discharge ports H1107 for discharging ink and ink supply ports H1102 that communicate with the discharge ports and supply ink to the discharge ports. The discharge ports are formed in a discharge port forming member H1106, and the ink supply ports are formed in a silicon substrate H1110.

The silicon substrate H1110 has a thickness in the range of 0.5 to 1.0 mm. The ink supply ports H1102 are formed in the silicon substrate H1110 by anisotropic etching. Moreover, exothermic elements H1103 are formed on the silicon substrate H1110. The discharge ports H1107 are formed in the silicon substrate H1110 by photolithography in such a manner that the discharge ports H1107 correspond to the exothermic elements H1103. Furthermore, bumps H1105 made of Au or the like are disposed on the silicon substrate H1110. The bumps H1105 serve as electrode portions for supplying electric signals and electric power for driving the exothermic elements H1103.

Referring to FIG. 6B, the tank holder unit 200 including a flow path member 201 in which an ink flow path, which characterizes the invention, is formed will be described in detail.

As illustrated in FIG. 6B, the tank holder unit 200 includes a tank holder 210 and a flow path plate 220. The tank holder 210 holds the ink tank 40. The flow path plate 220 is joined to the tank holder 210 so as to form the ink flow path. A flow path forming portion 211, which is to be joined to the flow path plate 220, is integrally formed with the tank holder 210. The flow path forming portion 211 and the flow path plate 220 constitute the flow path member 201. The flow path plate 220 has openings 220a that communicate with the recording element substrate H1101 of the recording element unit 300 illustrated in FIG. 6B.

The tank holder unit 200, which is disposed between the ink tank 40 and the recording element substrate H1101, serves to supply ink from the ink tank 40 to the recording element substrate H1101 through the ink flow path and the openings 220a.

In the flow path forming portion 211 illustrated in FIG. 6B, grooves are formed so as to serve as a flow path portion constituting a portion of a wall of an ink flow path 224. However, the grooves may not be formed in the flow path forming portion 211. In order that the ink flow path 224 is formed when the flow path forming portion 211 and the flow path plate 220 are joined together, it is sufficient that grooves are appropriately formed in at least one of the flow path forming portion 211 and the flow path plate 220 so that the grooves may form a portion of a wall of the ink flow path.

In order to join the flow path forming portion 211 and the flow path plate 220 together by laser welding, it is necessary that one of the flow path members be transparent to a laser beam and the other of the flow path members be capable of absorbing a laser beam.

In the embodiment of the invention, the flow path plate 220 is transparent to a laser beam and the flow path forming portion 211 is capable of absorbing a laser beam so that the flow path members can be easily irradiated with a laser beam.

In the embodiment of the invention, the flow path forming portion 211 and the tank holder 210 are integrally formed. However, the flow path forming portion 211 and the tank holder 210 may be independently formed, and the flow path member 201 in which the flow path forming portion 211 and the flow path plate 220 are joined together may be attached to the tank holder 210.

Regarding the invention, the phrase "a transparent member that is transparent to a laser beam" refers to a member having a transmittance equal to or greater than 30% when the member having a thickness of 2.0 mm is irradiated with a laser beam. The phrase "an absorption member that is capable of absorbing a laser beam" refers to a member having an absorptance equal to or greater than 90% when the member having a thickness of 2.0 mm is irradiated with a laser beam. By using the members having such transmittance and absorptance, the transparent member and the absorption member can be welded by laser welding.

Hereinafter, specific embodiments of the invention will be described in detail with reference to the drawings.

First Embodiment

A first embodiment of the invention will be described with reference to the drawings.

Figure 1A:
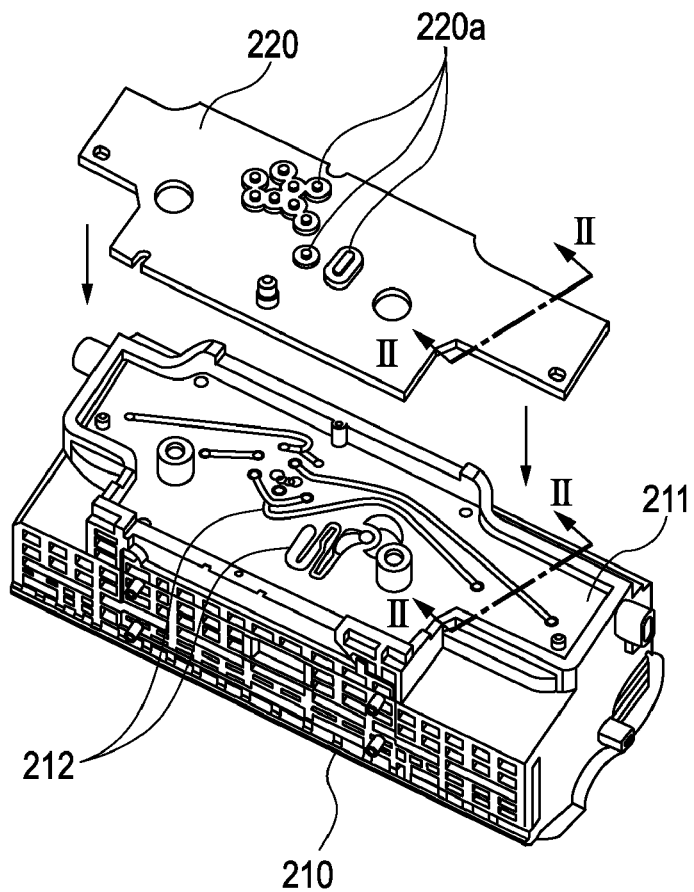
FIGS. 1A to 1C are schematic views illustrating a process of laser welding an inkjet recording head according to an embodiment of the invention.
Figure 1B:
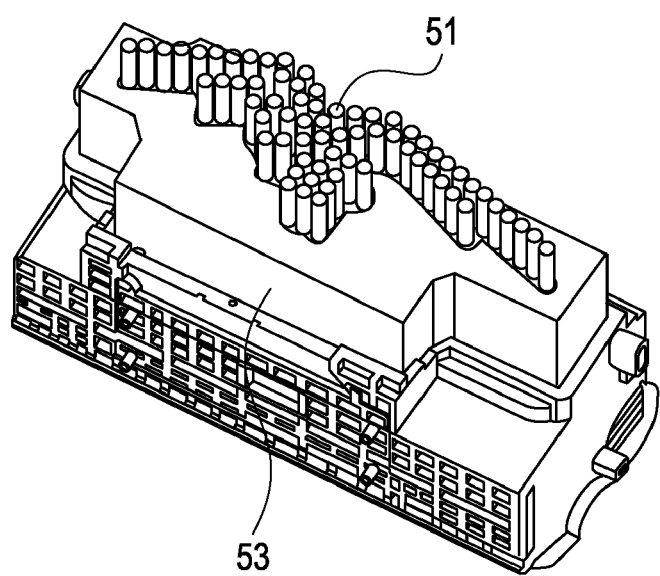
Figure 1C:
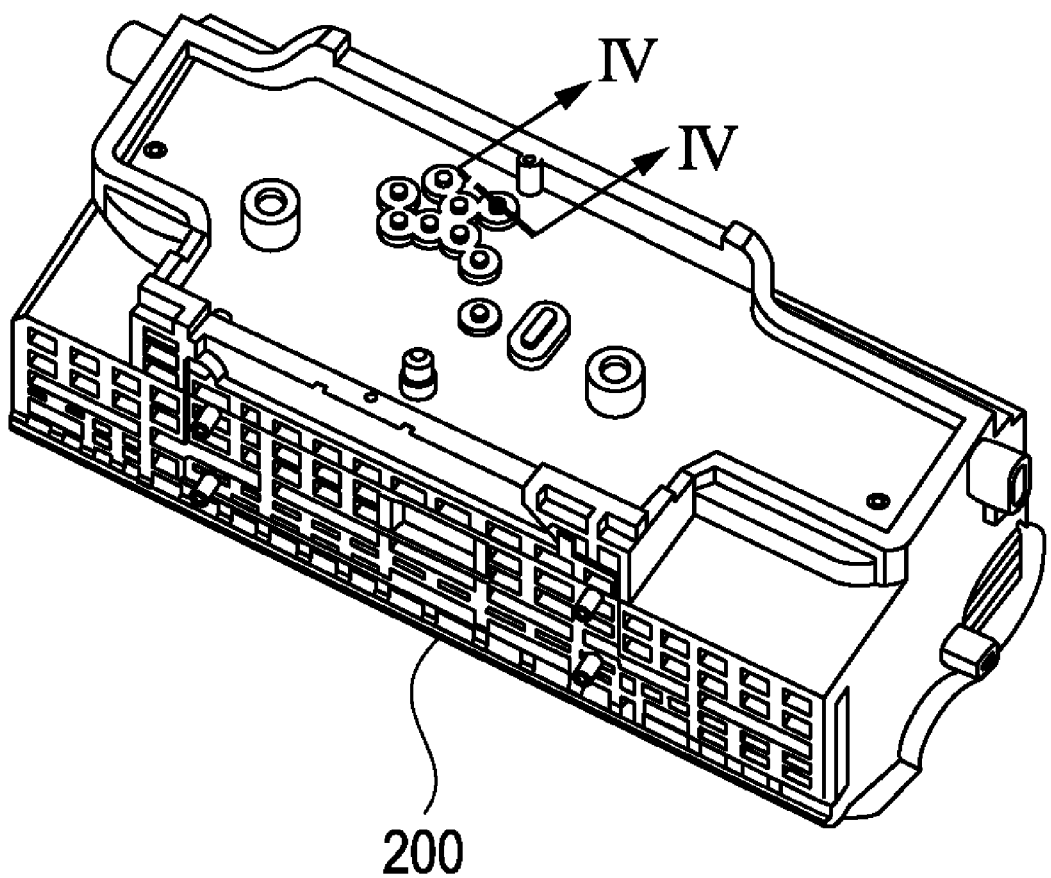

FIGS. 1A to 1C are perspective views illustrating, in the process of manufacturing a recording head, steps of attaching a flow path plate 220 to a tank holder 210 in which a flow path forming portion 211 is formed. An inclined surface formed in the flow path forming portion 211, which will be described below, is omitted from FIG. 1A.

FIG. 1A illustrates steps of preparing the flow path plate 220 and the flow path forming portion 211, which is integrally formed with the tank holder 210; and making the flow path plate 220 and the flow path forming portion 211 contact each other, at the periphery of an ink flow path to be welded, in such a manner that a flow path portion is disposed between the flow path plate 220 and the flow path forming portion 211.

FIG. 1B shows a step of holding the flow path plate 220 using a pressing jig 53, which is designed for use in laser irradiation, so that the flow path forming portion closely contacts the flow path plate, and irradiating the flow path forming portion with a laser beam by using a laser beam irradiation apparatus 51 after the step illustrated in FIG. 1A has finished. The laser beam irradiation apparatus 51 emits a laser beam through the transparent member toward a periphery 223 of the ink flow path to be welded and toward a flow path portion of the flow path forming portion 211, the flow path portion constituting a portion of a wall of the ink flow path.

FIG. 1C illustrates a state in which the flow path plate 220 and the flow path forming portion 211 are joined together (the tank holder unit 200).

Figure 2C:
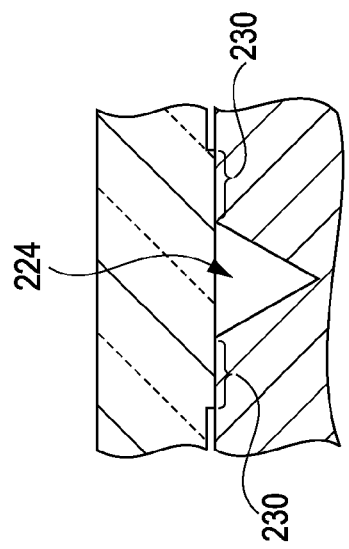
FIGS. 2A to 2C are explanatory views of a first embodiment of the invention.
Figure 2B:
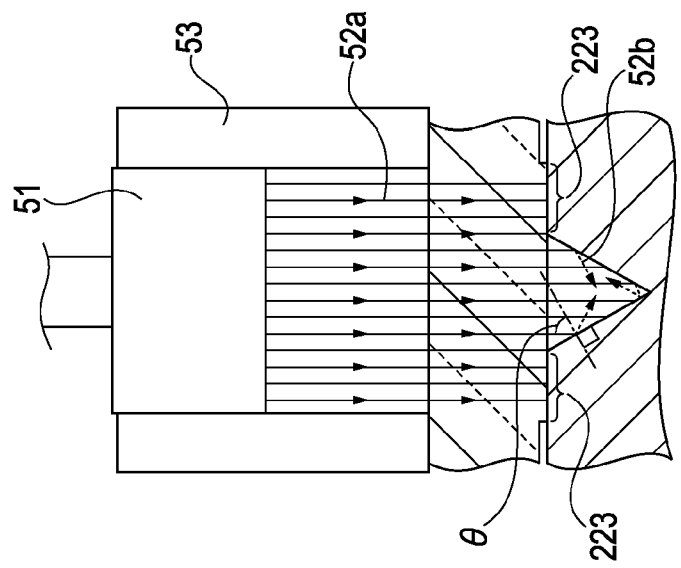
Figure 2A:
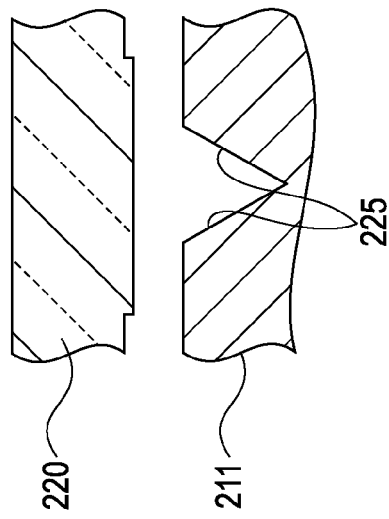

FIG. 2A is a sectional view taken along line II-II of FIG. 1A, and FIGS. 1A to 1C correspond to FIGS. 2A to 2C, respectively. Referring to FIGS. 2A to 2C, specific structures of the flow path forming portion and the flow path plate will be described.

The first embodiment is configured so that damage caused by a laser beam to a flow path portion 212 (see FIG. 1A) of an ink flow path 224 can be reduced, the flow path portion 212 being indirectly irradiated with the laser beam through the flow path plate 220. The flow path portion 212 is a portion of the ink flow path 224 that is disposed along a weld surface at which the flow path forming portion 211 and the flow path plate 220 are welded.

As illustrated in FIGS. 2A to 2C, in the first embodiment, the flow path portion 212 is constituted by an inclined surface 225 so as to reflect a laser beam 52a. The inclined surface 225 is inclined with respect to the direction of the laser beam 52a. In the first embodiment, a portion of the flow path portion 212 that is substantially parallel to the direction of the laser beam 52a that has passed through the flow path plate 220 (transparent member) is not included in the inclined surface 225. The same applies to second and third embodiments described below.

In the embodiment, the inclined surface 225 is constituted by two flat surfaces each inclined with respect to the direction of the laser beam that has passed through the flow path plate 220. In other words, as illustrated in FIG. 2C, the inclined surface 225 is inclined with respect to a weld surface 230 at which the flow path plate 220 and the flow path forming portion 211 are welded.

In the embodiment, the principal surface of the flow path plate 220 and a portion of the flow path plate 220, the portion constituting a portion of a wall of the flow path, is perpendicular to the laser beam emitted from the laser beam irradiation apparatus 51 and parallel to the weld surface 230. Thus, most of the laser beam emitted from the laser beam irradiation apparatus 51 passes through the flow path plate 220 without being diffracted or reflected by the flow path plate 220, and is incident on the flow path forming portion 211. However, if the laser beam is diffracted or reflected when the laser beam passes through the flow path plate 220, the direction of the laser beam that has passed through the flow path plate 220 and is incident on the flow path forming portion 211 may not be the same as the direction in which the laser beam was emitted from the laser beam irradiation apparatus 51. Even in such a case, the invention is applicable, as long as the inclined surface 225 is inclined with respect to the direction of the laser beam that has passed through the flow path plate 220.

In general, a laser beam is reflected by a reflecting surface in accordance with an angle of incidence θ (larger than 0° and smaller than 90°, see FIG. 2B). The proportion of the laser beam that is reflected (reflectance) increases with an increasing angle of incidence. For example, if the angle of incidence with respect to the reflecting surface is 0°, almost all of the laser beam is absorbed. If the angle of incidence is equal to or greater than 45°, the proportion of the laser beam that is reflected exceeds the proportion of the laser beam that is absorbed.

Therefore, as illustrated in FIG. 2B, it is sufficient that the angle of incidence of the laser beam with respect to the inclined surface 225 be larger than 0°. It is desirable that the incident angle be equal to or greater than 45° so as to reduce damage to the ink flow path. As illustrated in FIG. 2B, a portion of the laser beam 52a that has reached the inclined surface 225 is reflected and becomes a reflected beam 52b, and the remaining portion is absorbed by the inclined surface 225. Even if the reflected beam 52b reaches the inclined surface 225 again and all of the reflected beam 52b is absorbed by the inclined surface 225, damage caused by the reflected beam 52b to the flow path portion 212 is smaller than the damage caused by the laser beam 52a because the intensity of the reflected beam 52b is lower than that of the laser beam 52a. Thus, by making the angle of incidence equal to or greater than 45°, 50% or more of the laser beam 52a can be reflected, whereby damage to the ink flow path 224 can be reduced.

As described above, by forming the flow path portion with the inclined surface, reflectance can be increased and the proportion of the laser beam that is absorbed by the flow path portion can be reduced. As a result, without using a mask corresponding to a fine ink flow path, damage to the ink flow path illustrated in FIGS. 11A to 11C can be reduced.

The inclined surface may be formed in a region of a flow path portion of the flow path forming portion 211 that may be severely damaged by irradiation of the laser beam.

Figure 3:
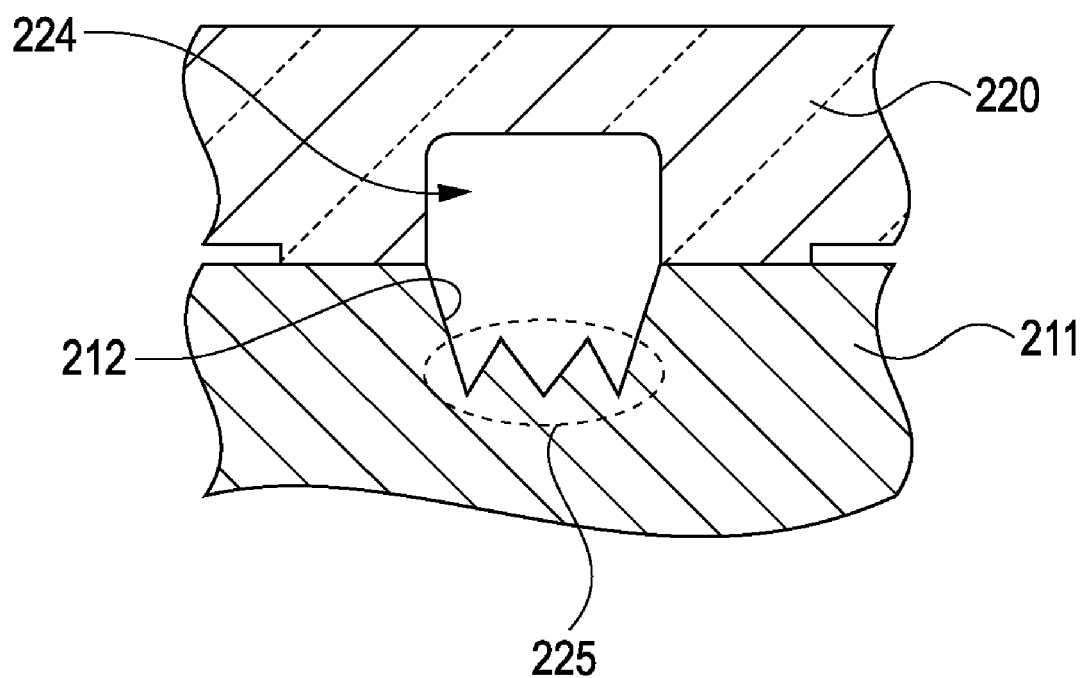
FIG. 3 is an explanatory view of the first embodiment of the invention.

As illustrated in FIG. 3, the flow path portion 212 may include three or more inclined surfaces 225. In an embodiment illustrated in FIGS. 2A to 2C, the inclined surface 225 includes the flat surfaces. However, even if the inclined surface 225 includes a curved surface, similar advantages as in the case described by using FIGS. 2A to 2C can be obtained.

When the flow path portion 212 is constituted by three or more inclined surfaces, as compared with the case when the flow path portion 212 is constituted by two or fewer inclined surfaces, the angle of incidence of the laser beam with respect to the inclined surface can be increased while limiting the depth of the flow path portion 212. Thus, the thickness of the flow path forming portion 211 can be reduced, which is effective for reducing the size of the recording head and the size of the recording apparatus.

As illustrated in FIG. 2B, when welding the flow path forming portion 211 and the flow path plate 220, the flow path forming portion 211 is made to contact the flow path plate 220 only at the periphery 223 of the flow path portion and welded only at the periphery 223.

By providing a contact portion and a non-contact portion in this manner, when the flow path forming portion 211 is made to contact the flow path plate 220, pressure is concentrated on the contact portion (the periphery 223 of the flow path portion) so that contact at the contact portion becomes closer.

As illustrated in FIG. 2B, when the periphery 223 of the flow path portion is irradiated with a laser beam, dye or pigment included in the flow path forming portion 211 (absorption member) are heated and resin included in the dye or the pigment is melted. The heat generated at this time is transferred to the flow path plate 220. The flow path plate 220 is melted by the heat, so that the weld surface 230 is formed. At this time, since the heat is efficiently transferred and the contact is close at the periphery 223 of the flow path portion, the weld surface 230 illustrated in FIG. 2C can be strongly formed.

In the embodiment, transparent Noryl "TPN9221" (made by SABIC Innovative Plastics that was formerly GE Plastics) is used as a material of the transparent member. Transparent Noryl is a transparent material that allows a laser beam to pass therethrough and is highly resistant to corrosion caused by ink. Alternatively, transparent Noryl "TN300" (made by SABIC Innovative Plastics), which does not include a coloring material, can be used as a material of the transparent member.

The term "Noryl" is a common name for modified polyphenylene ether or modified polyphenylene oxide. Noryl is a thermoplastic resin made by modifying polyphenylene ether (polyphenylene oxide) so as to increase heat resistance and strength. Noryl also has a strong resistance to acids and alkalis.

As a material of the absorption member, black Noryl "SE1X" (made by SABIC Innovative Plastics), which includes dye or pigment that absorbs a laser beam, is used.

Second Embodiment

Next, a second embodiment of the invention will be described.

Description of structures similar to those in the first embodiment is omitted and like numerals are used for corresponding portions. Descriptions of a method of laser welding and materials for a flow path forming portion and a flow path plate are omitted because they are similar to those in the first embodiment.

Figure 4A:
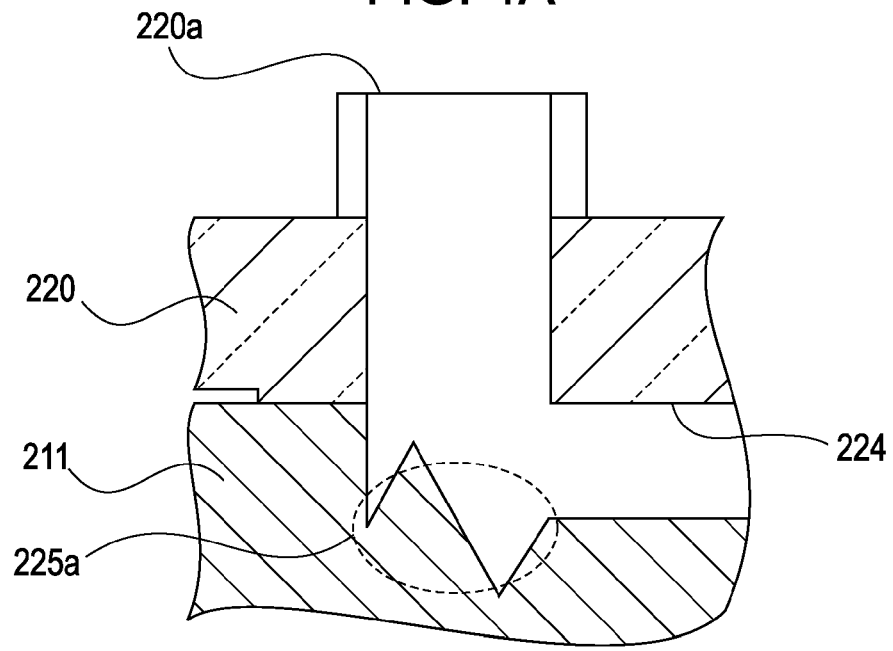
FIGS. 4A and 4B are explanatory views of a second embodiment of the invention.
Figure 4B:
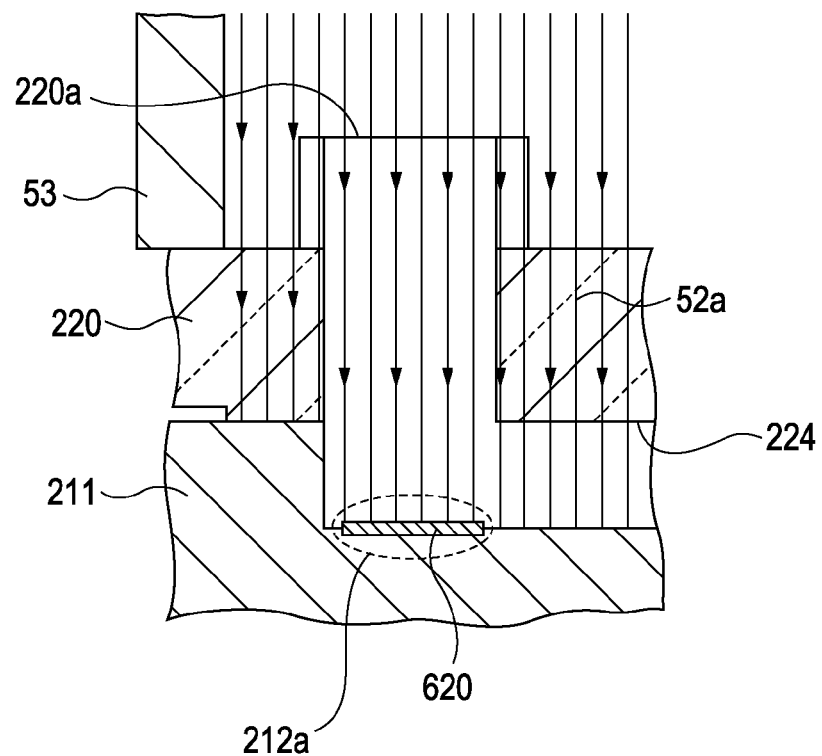

FIG. 4A is a sectional view taken along IV-IV of FIG. 1C illustrating the structure of the flow path portion. FIG. 4B is an explanatory view illustrating damage caused to the ink flow path when the structure of the embodiment is not adopted.

As illustrated in FIG. 4B, a damaged portion 620 may be formed in a flow path portion 212a of the ink flow path 224, when the flow path portion 212a is irradiated with a laser beam that has passed through an opening 220a formed in the flow path plate 220. Since the damaged portion 620 formed in the flow path portion 212a has been directly irradiated with the laser beam 52a that passed through the flow path plate 220, which is a transparent member, so that the damage caused by the laser beam 52a to the damaged portion 620 is heavier than the damage to the flow path 212 described with respect to the first embodiment. In some cases, damage to the flow path portion 212 described with respect to the first embodiment may be slight and it may not be necessary for the flow path portion 212 to be constituted by an inclined surface. However, even in such cases, it is necessary to reduce heavy damage that may be caused to the flow path portion 212a.

With the second embodiment, the damage caused to the flow path portion 212a by the laser beam is reduced with the following structures.

As illustrated in FIG. 4A, in the second embodiment, the flow path portion 212a of the ink flow path 224, which is directly irradiated with a laser beam, is formed by an inclined surface 225a and a surface that is substantially parallel to the direction of the laser beam. With this structure, as in the first embodiment, a portion of the laser beam 52a that is directly incident on the flow path portion 212a is reflected, so that damage caused by the laser beam to the flow path portion 212a can be reduced.

The configuration of the inclined surface 225a is not limited to the shape illustrated in FIG. 4A. As long as the inclined surface 225a is capable of reflecting the laser beam 52a, an advantage similar to that of the inclined surface 225a illustrated in FIG. 4A can be obtained.

By applying both of the configurations of the first embodiment and the second embodiment to a recording head, damage to the ink flow path can be further reduced. As described above, by forming an inclined surface in the flow path portion, reflectance can be increased and the proportion of the laser beam absorbed by the flow path portion can be reduced. Thus, the damage to the ink flow path illustrated in FIG. 4B can be reduced.

Third Embodiment

Next, a third embodiment of the invention will be described.

Description of structures similar to those in the first and second embodiments is omitted and like numerals are used for corresponding portions. Descriptions of a method of laser welding and materials for a flow path forming portion and a flow path plate are omitted because they are similar to those in the first embodiment.

Figure 5:
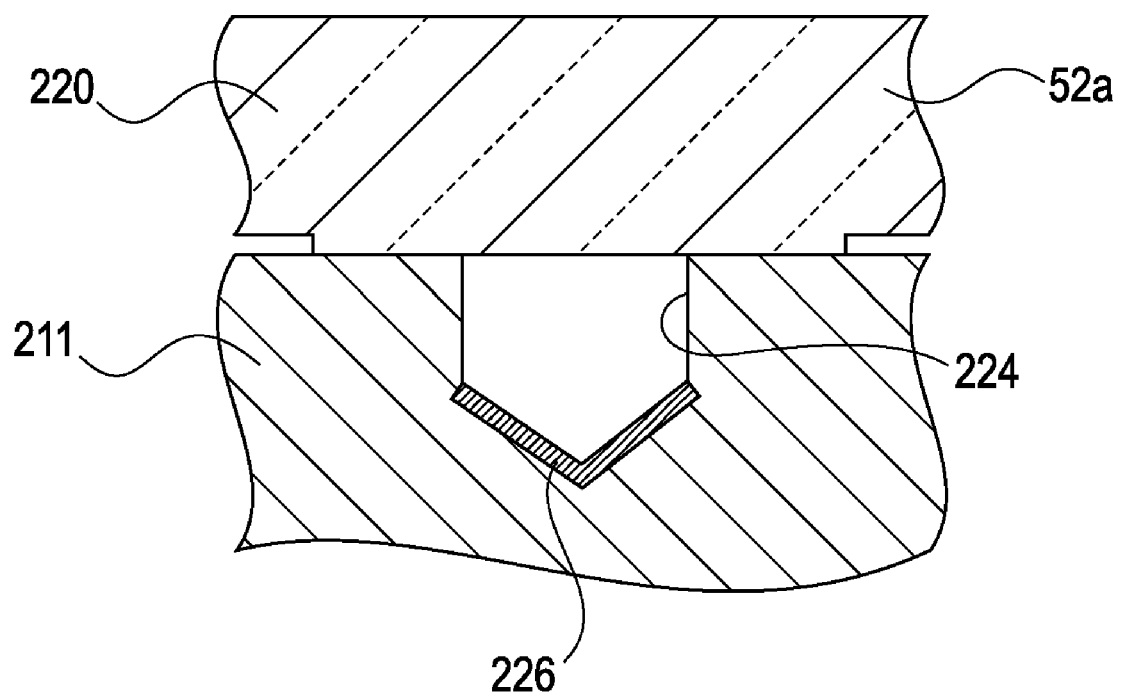
FIG. 5 is an explanatory view of a third embodiment of the invention.

As illustrated in FIG. 5, in the embodiment, a flow path portion includes an inclined surface 226 and a surface that is substantially parallel to the direction of the laser beam. The inclined surface 226 of the flow path portion has a mirror finish. By providing a mirror finish to the inclined surface, the reflectance of the inclined surface can be increased. Thus, even if the inclined surface is inclined at a small angle with respect to the direction of the laser beam, that is, even if the angle of incidence of the laser beam with respect to the inclined surface is small, damage caused by the laser beam to the flow path portion can be reduced. Therefore, the inclined surface can be provided while limiting the depth of the flow path portion.

A mirror finish can be provided to the inclined surface 226 by lapping a surface of a mold for molding the flow path forming portion 211, the surface of the mold corresponding to the inclined surface 226.

As described above with respect to the second embodiment, damage caused by the laser beam to the flow path portion 212a is heavier than that to the flow path portion 212 in the first embodiment. Therefore, even if the angle of incidence of the laser beam is the same, by providing a mirror finish only to the inclined surface 225a, the reflectance of the inclined surface 225a of the flow path portion 212a can be made larger than that of the inclined surface 225 of the flow path portion 212. With this structure, damage to the flow path portion 212a can be reduced, while limiting the depth of the groove in the flow path portion 212a.

As heretofore described with respect to the first to third embodiments, by forming a portion of the ink flow path, which is constituted by an absorption member, with an inclined surface, damage caused by the laser beam to the ink flow path can be reduced. Accordingly, a liquid discharge head is provided with which the situation caused by the damaged portion is reduced and which has a high reliability.

While the present invention has been described with reference to exemplary embodiments, it is to be understood that the invention is not limited to the disclosed exemplary embodiments. The scope of the following claims is to be accorded the broadest interpretation so as to encompass all modifications and equivalent structures and functions.

This application claims the benefit of Japanese Patent Application No. 2008-324478 filed Dec. 19, 2008, which is hereby incorporated by reference herein in its entirety.

What is claimed is:

1. A liquid discharge head comprising:
a liquid discharge substrate including a discharge port for discharging liquid; and
a flow path member including a transparent member that is transparent to a laser beam, an absorption member that is capable of absorbing a laser beam, and a flow path for supplying liquid to the liquid discharge substrate,
wherein the flow path is formed between the transparent member and the absorption member by emitting a laser beam toward a flow path portion of the absorption member constituting a portion of a wall of the flow path and toward a periphery of the flow path portion through the transparent member and thereby welding the transparent member and the absorption member to each other at the periphery of the flow path portion, and
wherein the flow path portion includes an inclined surface inclined with respect to a direction of the laser beam that has passed through the transparent member.

2. The liquid discharge head according to claim 1, wherein an angle of incidence of the laser beam with respect to the inclined surface is equal to or larger than 45°, the laser beam being emitted toward the flow path portion and the periphery of the flow path portion.

3. The liquid discharge head according to claim 1, wherein the inclined surface is constituted by a plurality of surfaces.

4. The liquid discharge head according to claim 1, wherein the inclined surface has a mirror finish.

5. The liquid discharge head according to claim 1, wherein the liquid discharge head includes a tank holder configured to hold a tank, and
wherein the absorption member is integrally formed with the tank holder.

6. A liquid discharge head comprising:
a liquid discharge substrate including a discharge port for discharging liquid; and
a flow path member including a flow path for supplying liquid to the liquid discharge substrate,
wherein the flow path member includes a transparent member that is transparent to a laser beam and an absorption member that is capable of absorbing a laser beam, the transparent member including an opening through which the flow path communicates with the liquid discharge substrate,
wherein the flow path is formed between the transparent member and the absorption member by emitting a laser beam toward a flow path portion of the absorption member constituting a portion of a wall of the flow path and toward a periphery of the flow path portion through the transparent member and thereby welding the transparent member and the absorption member to each other at the periphery of the flow path portion, and
wherein a portion of the flow path portion directly irradiated with the laser beam that has passed through the opening includes an inclined surface inclined with respect to a direction of the laser beam.

7. A liquid discharge head according to claim 6,
wherein a portion of the flow path portion indirectly irradiated with the laser beam that has passed through the transparent member includes an inclined surface inclined with respect to a direction of the laser beam, and
wherein the inclined surface of the portion directly irradiated with the laser beam has a reflectance for a laser beam higher than a reflectance for a laser beam of the portion indirectly irradiated with the laser beam.

8. A liquid discharge head comprising:
a liquid discharge substrate including a discharge port for discharging liquid; and
a flow path member including a transparent member that is transparent to a laser beam, an absorption member that is capable of absorbing a laser beam, and a flow path for supplying liquid to the liquid discharge substrate,
wherein the flow path is formed between the transparent member and the absorption member by welding the transparent member and the absorption member to each other at a periphery a flow path portion of the absorption member constituting a portion of a wall of the flow path, wherein the flow path portion of the transparent member constituting the portion of the wall of the flow path includes a surface parallel to a weld surface at which the transparent member and the absorption member are welded to each other, and wherein the flow path portion of the absorption member includes an inclined surface inclined with respect to the weld surface.

9. A flow path member used for a liquid discharge head including a flow path for supplying liquid to a liquid discharge substrate including a discharge port for discharging liquid, the flow path member comprising:

a transparent member that is transparent to a laser beam, the transparent member including an opening through which the flow path communicates with the liquid discharge substrate; and an absorption member that is capable of absorbing a laser beam, wherein the flow path is formed between the transparent member and the absorption member by emitting a laser beam toward a flow path portion of the absorption member constituting a portion of a wall of the flow path and toward a periphery of the flow path portion through the transparent member and thereby welding the transparent member and the absorption member to each other at the periphery of the flow path portion, and wherein a portion of the flow path portion directly irradiated with the laser beam that has passed through the opening includes an inclined surface inclined with respect to a direction of the laser beam.

10. A method of manufacturing a liquid discharge head, the liquid discharge head including a liquid discharge substrate, a transparent member that is transparent to a laser beam, an absorption member that is capable of absorbing a laser beam, and a flow path formed between the transparent member and the absorption member, the liquid discharge substrate including a discharge port for discharging liquid, the flow path supplying liquid to the liquid discharge substrate, the method comprising:

making the transparent member contact the absorption member in such a manner that a flow path portion of the absorption member is disposed between the transparent member and the absorption member, the flow path portion including an inclined surface inclined with respect to the direction of a laser beam and constituting a portion of a wall of the flow path; and emitting a laser beam toward the flow path portion of the absorption member constituting the portion of the wall of the flow path and toward a periphery of the flow path portion through the transparent member so as to weld the transparent member and the absorption member to each other at the periphery of the flow path portion.

* * * * *